United States Patent
Ok et al.

(10) Patent No.: US 7,400,896 B2
(45) Date of Patent: Jul. 15, 2008

(54) APPARATUS AND METHOD FOR ESTIMATING A SIGNAL POWER TO INTERFERENCE POWER RATIO IN A WIRELESS COMMUNICATION SYSTEM

(75) Inventors: Kwang-Man Ok, Yongin-si (KR); Chung-Gu Kang, Seoul (KR); Min-Goo Kim, Yongin-si (KR); Wi-Sang Rho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 11/217,669

(22) Filed: Sep. 2, 2005

(65) Prior Publication Data

US 2006/0045195 A1    Mar. 2, 2006

(30) Foreign Application Priority Data

Sep. 2, 2004    (KR) ...................... 10-2004-0069967

(51) Int. Cl.
  *H04B 15/00* (2006.01)
(52) U.S. Cl. .................... 455/506; 455/63.1; 455/65; 455/67.16; 370/335; 370/252; 375/240.18
(58) Field of Classification Search .............. 455/506, 455/63.1, 65, 10, 18, 67.16, 242.2, 243.2, 455/114.2; 370/335, 252; 375/240.18, 149
See application file for complete search history.

(56) References Cited

U.S. PATENT DOCUMENTS 5,907,543 A * 5/1999 Jeon et al. .................... 370/335
6,034,952 A * 3/2000 Dohi et al. ................... 370/335
6,215,827 B1 * 4/2001 Balachandran et al. ....... 375/262
6,526,271 B1 * 2/2003 Uesugi et al. ............... 455/296
2004/0076132 A1 * 4/2004 Tiirola et al. ................ 370/335
2004/0102203 A1 * 5/2004 Tiirola et al. ................ 455/515
2006/0292994 A1 * 12/2006 Oura et al. ............... 455/67.16
2007/0183442 A1 * 8/2007 Shibata ....................... 370/437

FOREIGN PATENT DOCUMENTS

KR    1020020005808 A    1/2002
KR    1020040050813 A    6/2004

* cited by examiner

*Primary Examiner*—Matthew Anderson
*Assistant Examiner*—Minh Dao
(74) *Attorney, Agent, or Firm*—Roylance, Abrams, Berdo & Goodman, L.L.P.

(57) ABSTRACT

A transmission and reception apparatus and method for use in a wireless communication system, and an apparatus and method for adaptively transmit and receive a signal according to channel state in a wireless communication system. An apparatus for adaptively performing transmission according to a state of a channel transmitted from a transmitter to at least one receiver includes a signal to interference ratio estimator for estimating a signal to interference ratio of the channel using a signal transmitted from the at least one receiver; and an adaptive transmitter for transmitting data to the at least one receiver on a basis of the estimated signal to interference ratio.

9 Claims, 11 Drawing Sheets

APPARATUS AND METHOD FOR ESTIMATING A SIGNAL POWER TO INTERFERENCE POWER RATIO IN A WIRELESS COMMUNICATION SYSTEM

PRIORITY

This application claims the benefit under 35 U.S.C. § 119(a) of an application entitled "Apparatus and Method for Estimating a Signal Power to Interference Power Ratio in a Wireless Communication System" filed in the Korean Intellectual Property Office on Sep. 2, 2004 and assigned Serial No. 2004-69967, the entire contents of which are hereby incorporated by reference.

BACKGROUND OF THE INVENTION

1. Field of the Invention

The present invention generally relates to a transmission and reception apparatus and method for use in a wireless communication system. More particularly, the present invention relates to an apparatus and method for adaptively transmitting and receiving a signal according to a channel state or condition in a wireless communication system.

2. Description of the Related Art

A wireless communication system transmits and receives a signal through a radio channel between a transmitter and a receiver. The transmitter modulates data into a signal through which wireless communication is enabled, and outputs the modulated data. The receiver receives and demodulates a modulated signal transmitted through the radio channel.

The above-described wireless communication system controls bit and power allocation for a transmission signal to maximize the channel capacity between the transmitter and the receiver. Bits of the transmission signal represent bits of a transmission signal per modulation symbol, and differ according to modulation schemes such as binary phase shift keying (BPSK), quadrature phase shift keying (QPSK), 16-quadrature amplitude modulation (QAM), and so on. The modulation schemes are adaptively changed according to a radio channel state or condition.

Accordingly, the transmitter and receiver must have knowledge of channel state information (CSI). However, research on adaptive resource allocation based on the CSI has been focused on a downlink of the wireless communication system because the downlink requires a higher transmission rate than an uplink. For a better understanding of the present invention, it is assumed that the transmitter is a base station (BS) and the receiver is a user.

When the BS obtains the CSI, time division duplexing (TDD) and frequency division duplexing (FDD) operate differently.

TDD is a scheme in which the uplink and downlink share the same channel on the basis of time division, and FDD is a scheme in which the uplink and downlink use different channels regardless of time. Because channel characteristics are the same between the downlink and uplink in the TDD scheme, the BS measures CSI of the uplink and regards the measured CSI as CSI of the downlink if a channel state is the same during one frame.

In the case of FDD, the downlink and uplink have different channel states due to a large frequency interval therebetween. Accordingly, the user measures the CSI of the downlink and then feeds back the measured CSI to the BS. However, in a process in which the user feeds back the CSI, performance degradation occurs due to the feedback overhead, feedback delay, and feedback error. In the process of acquiring the CSI, it can be seen that the TDD system is better than the FDD system.

On the other hand, a cellular wireless communication system achieves high frequency efficiency through "frequency reuse". The term "frequency reuse" refers to the same frequency being used between cells that are not adjacent to each other. When a frequency reuse level is high, the frequency efficiency increases. However, a problem occurs in that the same channel interference from adjacent cells becomes severe. Accordingly, adaptive resource allocation applied to the cellular wireless communication system in which the frequency reuse level is high is based on a signal power to interference power ratio (SIR) instead of CSI. Because interference power in the SIR depends upon the user's location, the BS cannot measure downlink interference power. Therefore, even when the TDD system is used in the cellular wireless communication system in which the frequency reuse level is high, the user needs to measure a downlink SIR and feed back the measured SIR to the BS. However, there is a problem in that performance is degraded due to the feedback overhead, feedback delay, and feedback error in the feedback process as described above.

FIG. 1 is a block diagram illustrating a conventional adaptive transmission and reception apparatus operating on the basis of a SIR in a wireless communication system in which the same channel interference is present on an uplink and a downlink channel. In FIG. 1, the solid line indicates a signal flow between an adaptive transmitter and an adaptive receiver. Here, a signal is transmitted through a wireless interface.

Referring to FIG. 1, the adaptive transmitter 110 adaptively transmits information to the downlink/uplink on the basis of a SIR measure prior to feedback from a channel estimator/SIR measurer 120. The channel estimator/SIR measurer 120 measures a downlink/uplink SIR using a reference signal such as a pilot signal among downlink/uplink reception signals, and feeds back the measured SIR to the adaptive transmitter 110. The adaptive receiver 130 adaptively receives a downlink/uplink signal using a channel estimate output from the channel estimator/SIR measurer 120.

The representative technology capable of increasing the downlink capacity through adaptive resource allocation based on a SIR in the wireless communication system in which the same channel interference is present is referred to as an orthogonal frequency division multiple access (OFDMA) scheme using adaptive subchannel, bit and power allocation.

When multiple subcarriers are combined in the conventional OFDMA system, the combined subcarriers are referred to as a subchannel serving as a basic unit of user data mapping. The BS transmits a unique pilot symbol of a cell or sector at a uniform subcarrier and/or symbol interval. Each user measures a SIR value for an associated subchannel using pilot symbols positioned within a predetermined duration of each subchannel and feeds back the measured SIR value to the BS. The BS performs the adaptive subchannel, bit and power allocation using fed-back SIR measures for subchannels of all users. The BS maps, adaptively modulates, and transmits user data according to a result of the allocation, and notifies all user terminals of the allocation result. Each user terminal demodulates and extracts its own data according to the notified allocation result.

FIG. 2 is a block diagram illustrating a conventional downlink OFDMA apparatus for performing the adaptive subchannel, bit and power allocation.

Referring to FIG. 2, K users 240 receive a signal transmitted from the BS through K unique selective fading channels 230.

Referring to an internal structure of the BS 200, a subchannel, bit and power allocator 210 receives required transmission rates of all users, such as user transmission rates, every allocation period, and receives SIR measures for subchannels of all users every SIR measurement period. Then, the subchannel, bit and power allocator 210 performs the adaptive subchannel, bit and power allocation every allocation period, and outputs a result of the allocation to a subchannel, bit and power mapper 212. The subchannel, bit and power mapper 212 receives the allocation result output from the subchannel, bit and power allocator 210, and arranges all input user data, signaling data, and pilot symbols in temporal frequency gratings. The signaling data includes the allocation result such that the allocation result can be transferred to all users.

A predetermined number N of adaptive modulators 214 modulate the user data, signaling data, and pilot symbols using a modulation scheme associated with the number of allocated bits at a power allocated every subchannel and output modulation results to an inverse fast Fourier transform (IFFT) processor 216. The IFFT processor 216 transforms all subchannel modulation signals input from the adaptive modulators 214 in a parallel fashion according to the IFFT result. A parallel-to-serial (P/S) converter 218 converts parallel outputs of the IFFT processor 216 into a serial signal. A guard interval (GI) inserter 220 inserts a GI into the signal output from the P/S converter 218 and outputs a result of the insertion. The GI is used to mitigate inter-symbol interference (ISI) that occur due to the multipath delay when a signal goes through a radio channel. This is a well-known benefit of OFDM modulation. A signal output from the GI inserter 220 is transmitted to user terminals 240 through radio channels 230 corresponding to users.

An internal structure of the K-th user terminal 250 of the user terminals 240 is illustrated in FIG. 2.

A GI remover 252 removes a GI from a received signal and outputs a result of the removal. A serial-to-parallel (S/P) converter 254 converts an output signal of the GI remover 252 into parallel signals. A fast Fourier transform (FFT) processor 256 transforms the parallel signals output from the S/P converter 254 according to the FFT result. A predetermined number of adaptive demodulators 258 extract an allocation result from signaling data and perform adaptive demodulation using a channel estimate obtained from a channel estimator/SIR measurer 262 according to the number of bits of each subchannel allocated to User K.

A bit extractor 260 collects demodulated data of subchannels, allocated to User K, output from the adaptive demodulators 258. The user terminal 250 includes the channel estimator/SIR measurer 262. The channel estimator/SIR measurer 262 of the user terminal 250 receives signals output from the FFT processor 256, and obtains channel estimates and SIR measures for all subchannels. Then, the channel estimates obtained from the channel estimator/SIR measurer are transferred to the adaptive demodulators. Then, the SIR measures are fed back to the BS through a wireless process. To improve downlink performance through adaptive transmission and reception in a wireless communication system in which the same channel interference is present, the user measures a downlink SIR regardless of the above-described TDD and FDD and feeds back the measured SIR to the BS. However, a problem of performance degradation due to feedback overhead, feedback delay, and feedback error occurs in the feedback process.

Table 1 shows feedback overheads for the number of various users, the number of subchannels, and SIR measures.

TABLE 1

| $R_{CH}$ | K = 8 & N = 15 | K = 16 & N = 54 |
|---|---|---|
| 250 | 180 kbps | 1296 kbps |
| 500 | 360 kbps | 2592 kbps |

In Table 1, $R_{CH}$, K, and N denote a SIR measure, the number of users per cell, and the number of subchannels, respectively. The feedback overhead is computed by Equation (1).

$$Overhead_{FB} = R_{CH} \times K \times N \times 6 \text{ (bps)} \quad \text{Equation (1)}$$

In Equation (1), "6" is the number of bits representing a SIR for one subchannel. The feedback overhead increases in proportion to a SIR measure, the number of users per cell, and the number of subchannels, and significantly reduces uplink throughput. There is a problem in that the feedback delay limits an application range of an adaptive transmission and reception scheme at a low data transmission rate.

SUMMARY OF THE INVENTION

An aspect of the present invention is to solve at least the above problems and/or disadvantages and to provide at least the advantages described below. Accordingly, an aspect of the present invention is to provide an apparatus and method for improving the performance of a downlink through adaptive transmission and reception by estimating a downlink signal power to interference power ratio (SIR) in a base station of a wireless communication system in which the channel interference is present for the downlink and uplink.

The above and other aspects of the present invention can be achieved by an apparatus for adaptively performing transmission according to a state of a channel transmitted from a transmitter to at least one receiver. The apparatus comprises a signal to interference ratio estimator for estimating a signal to interference ratio of the channel using a signal transmitted from the at least one receiver, and an adaptive transmitter for transmitting data to the at least one receiver based on the estimated signal to interference ratio.

The above and other aspects of the present invention can also be achieved by an apparatus for adaptively performing transmission and reception according to a state of a channel transmitted from a transmitter to a receiver. The apparatus comprises an adaptive transmitter for estimating a signal to interference ratio for the receiver using a pilot symbol transmitted from the receiver and adaptively performing transmission according to the signal to interference ratio. An adaptive receiver transmits a pilot symbol spread with a unique pseudo noise code to the adaptive transmitter, calculates a channel estimate of a signal transmitted from the adaptive transmitter, and adaptively receives the transmitted signal.

The above and other aspects of the present invention can also be achieved by a method for adaptively performing transmission according to a state of a channel transmitted from a transmitter to a receiver. The method comprises the steps of transmitting a pilot symbol spread with a unique pseudo noise code from the receiver to the transmitter, receiving the pilot symbol and estimating a signal to interference ratio of the channel in the transmitter, and adaptively transmitting a signal from the transmitter to the receiver according to the estimated signal to interference ratio.

BRIEF DESCRIPTION OF THE DRAWINGS

The above and other aspects and advantages of the present invention will be more clearly understood from the following detailed description taken in conjunction with the accompanying drawings, in which.

Throughout the drawings, the same or similar elements, features and structures are represented by the same reference numerals.

DETAILED DESCRIPTION OF EXEMPLARY EMBODIMENTS

Exemplary embodiments of the present invention will be described in detail herein below with reference to the accompanying drawings. In the following description, detailed descriptions of functions and configurations incorporated herein that are well known to those skilled in the art are omitted for clarity and conciseness.

The embodiments of the present invention provide a means for improving downlink performance through adaptive transmission and reception by estimating a downlink signal power to interference power ratio (SIR) in a base station (BS) of a wireless communication system in which channel interference for both the uplink and downlink is present. For convenience, it is assumed that a transmitter is the BS and a receiver is a mobile station (MS). Alternatively, the transmitter may be the MS and the receiver may be the BS in accordance with another embodiment of the present invention.

Figure 3:
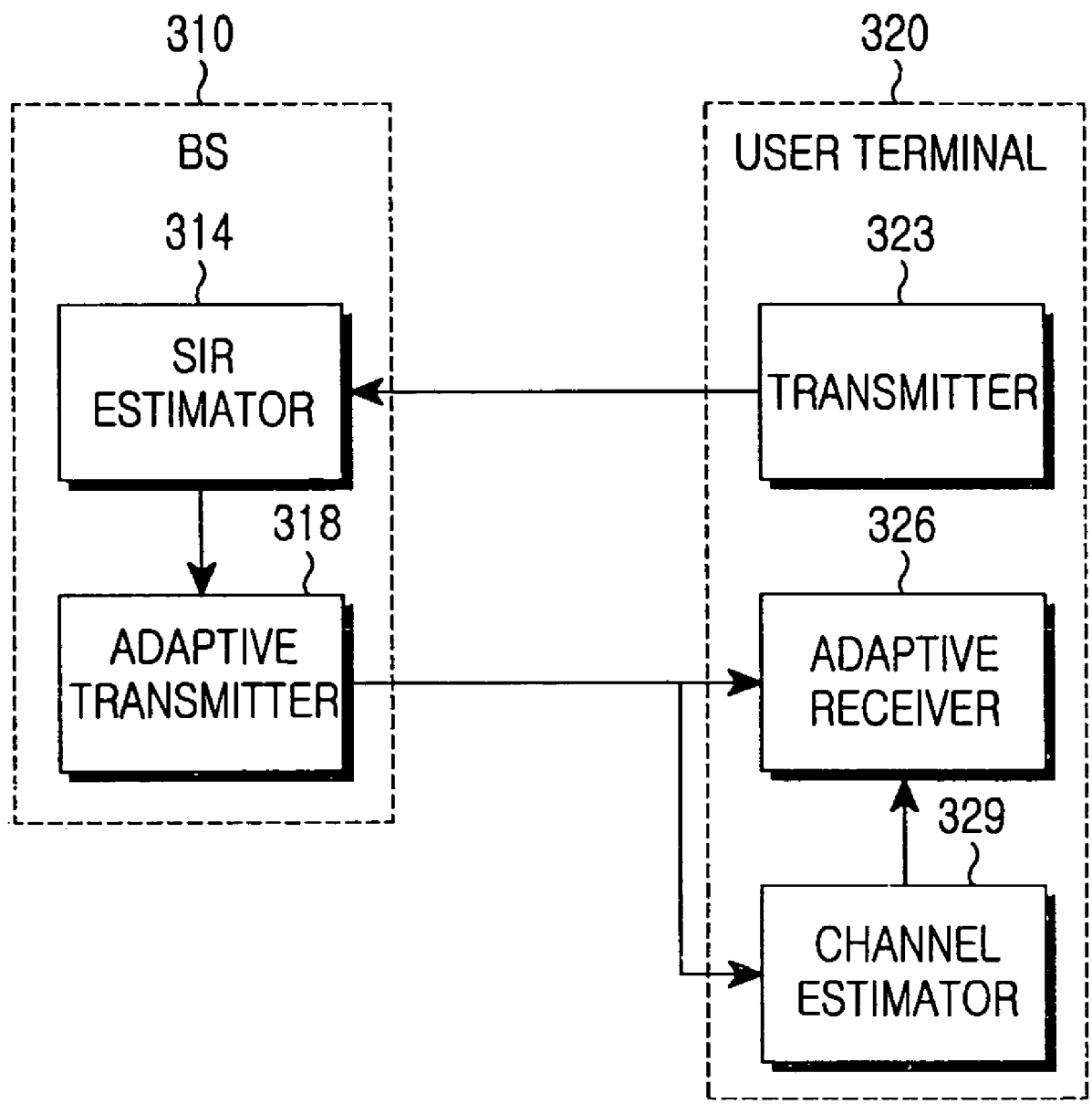
FIG. 3 is a block diagram illustrating an exemplary downlink adaptive transmission and reception apparatus based on a SIR in accordance with an embodiment of the present invention.

FIG. 3 is a block diagram illustrating an exemplary transmission and reception apparatus adaptive to a downlink of the BS in a wireless communication system based on time division duplexing (TDD) in accordance with an embodiment of the present invention.

Referring to FIG. 3, a BS 310 comprises an SIR estimator 314 for estimating a SIR for a user using a received uplink pilot symbol, and an adaptive transmitter 318 for adaptively transmitting data to the user through the downlink on the basis of the estimated SIR.

A user terminal 320 comprises a transmitter 323 for transmitting a pilot symbol spread with a unique pseudo-noise (PN) code to the uplink, a channel estimator 329 for estimating a channel state using a reference signal of downlink reception signals, and an adaptive receiver 326 for adaptively receiving a downlink reception signal based on a channel estimate from the channel estimator 329.

An embodiment of the present invention arranges the SIR estimator 314 within the BS 310, estimates a downlink SIR from an uplink signal, and performs adaptive transmission. Thus, the user does not need to transmit an additional feedback signal to the BS. A signal between the BS 310 and the user terminal 320 is transmitted and received through a wireless interface.

Figure 4A:
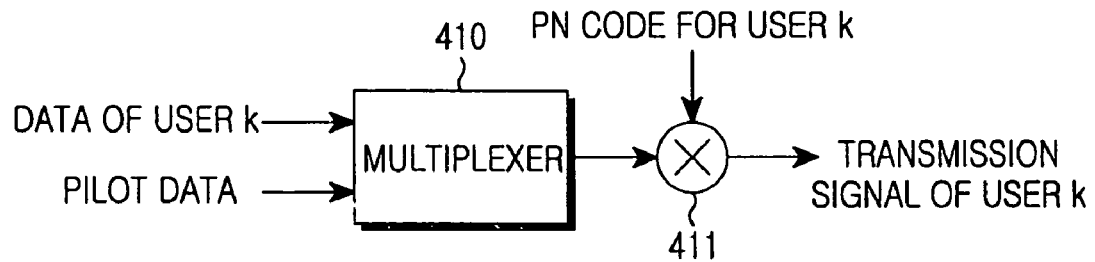
FIG. 4A illustrates an internal structure of an exemplary uplink transmitter for a user terminal in accordance with an embodiment of the present invention.
Figure 4B:
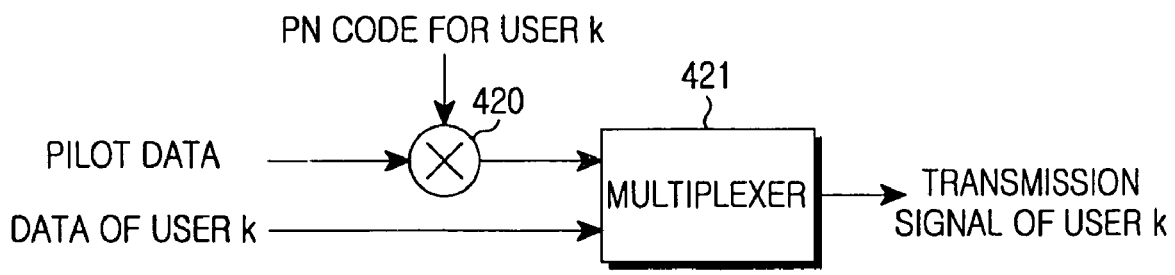
FIG. 4B illustrates an internal structure of an exemplary uplink transmitter of a user terminal in accordance with another embodiment of the present invention.

FIGS. 4A and 4B illustrate an internal structure of an exemplary transmitter 323 for the user terminal 320 of FIG. 3, respectively. FIG. 4A illustrates a code division multiple access (CDMA) transmitter, and FIG. 4B illustrates an orthogonal frequency division multiplexing (OFDM) transmitter.

Referring to FIG. 4A, a multiplexer 410 multiplexes input data of User k and known pilot data and outputs a result of the multiplexing. Here, all multiplexing schemes such as time division multiplexing (TDM) and in-phase/quadrature (I/Q) multiplexing can be applied. A spreader 411 spreads an output of the multiplexer 410 with a PN code for User k and outputs a result of the spread.

Referring to FIG. 4B, a spreader 420 spreads known pilot data with a PN code of User k and outputs a result of the spread. A multiplexer 421 multiplexes input data of User k and spread pilot data and outputs a result of the multiplexing. Here, all multiplexing schemes such as TDM and I/Q multiplexing can be applied.

Through a configuration of FIGS. 4A and 4B, pilot data is spread with a PN code mapped to an associated user and then the spread pilot data is output.

Figure 5:
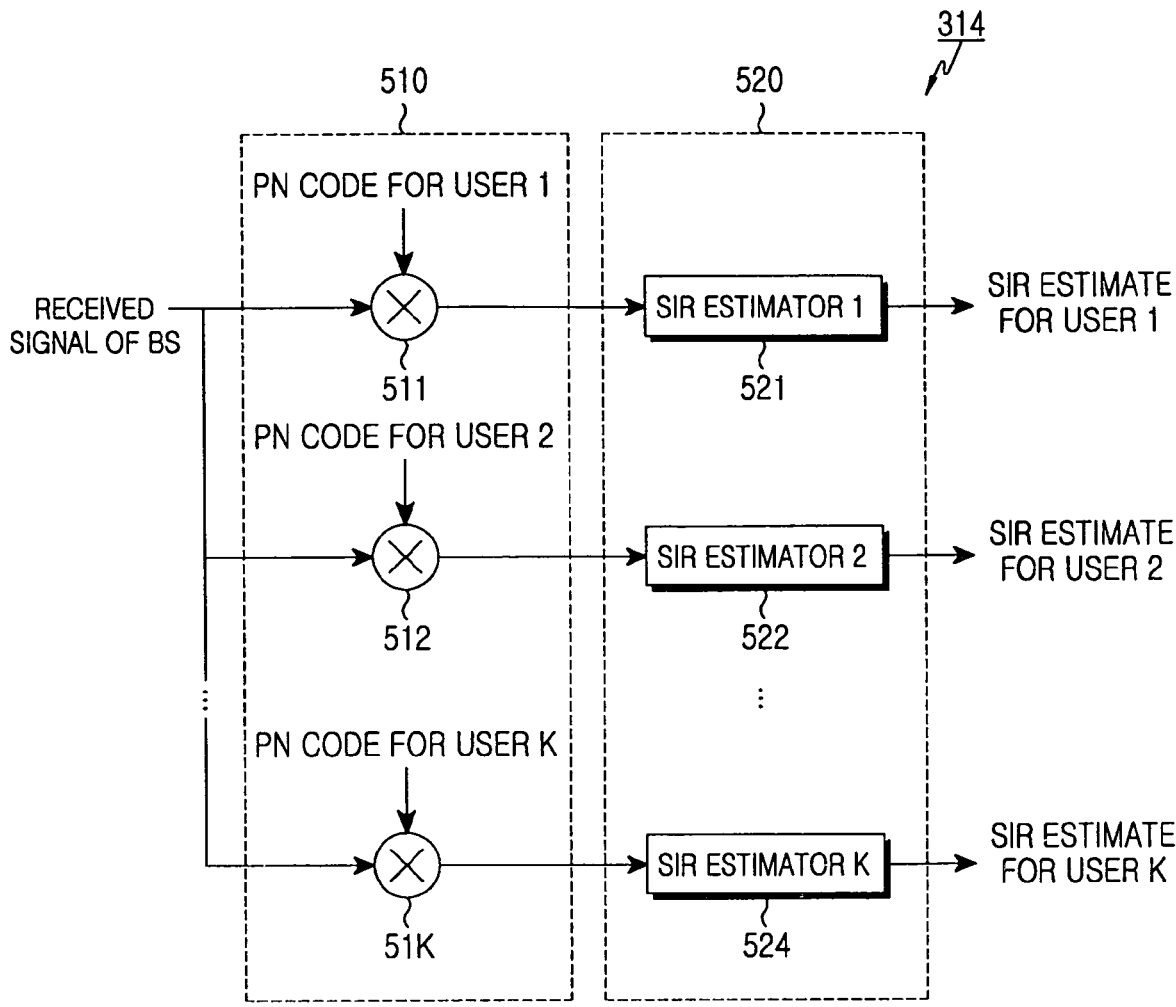
FIG. 5 is a block diagram illustrating an internal structure of an exemplary SIR estimator in accordance with an embodiment of the present invention.

A detailed configuration of the SIR estimator 314 for the BS 310 of FIG. 3 is illustrated in FIG. 5. The SIR estimator 314 illustrated in FIG. 5 can be applied to either the CDMA system or the OFDM system.

Referring to FIG. 5, the SIR estimator 314 of the BS estimates downlink SIR values for subchannels of all user terminals located within coverage of the BS. In FIG. 5, a received signal of the BS is a sum of signals received from all users.

A despreading unit 510 despreads the received signal of the BS with PN codes allocated to K users and outputs the despread signal. Spread pilot signals as illustrated in FIGS. 4A and 4B are despread through the despreading unit 510 and then the despread signals are output. A SIR estimation unit 520 estimates downlink SIR values for all subchannels of associated users, and outputs the estimated values to the adaptive transmitter 318.

Figure 6:
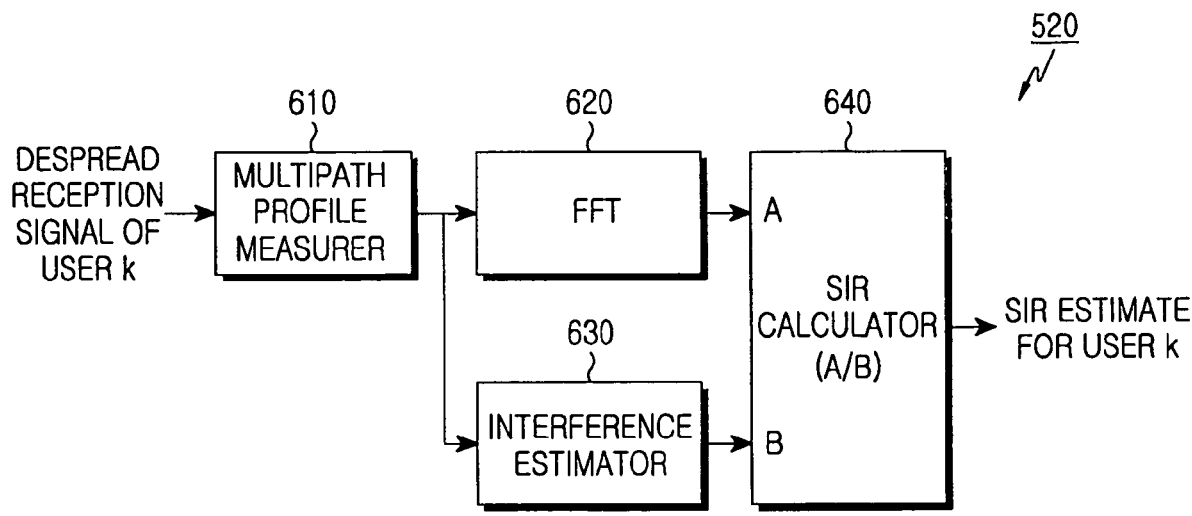
FIG. 6 is a block diagram illustrating an internal structure of an exemplary SIR estimation unit in accordance with an embodiment of the present invention.

FIG. 6 illustrates details of the SIR estimation unit 520.

Referring to FIG. 6, a multipath profile measurer 610 finds a multipath profile between User k and the BS from the received signal of the BS despread with a PN code of User k with respect to various path delay time-points of the received signal, that is, the uplink signal. The multipath profile has path delay and intensity in each path. The multipath profile is illustrated in FIG. 7.

Figure 7:
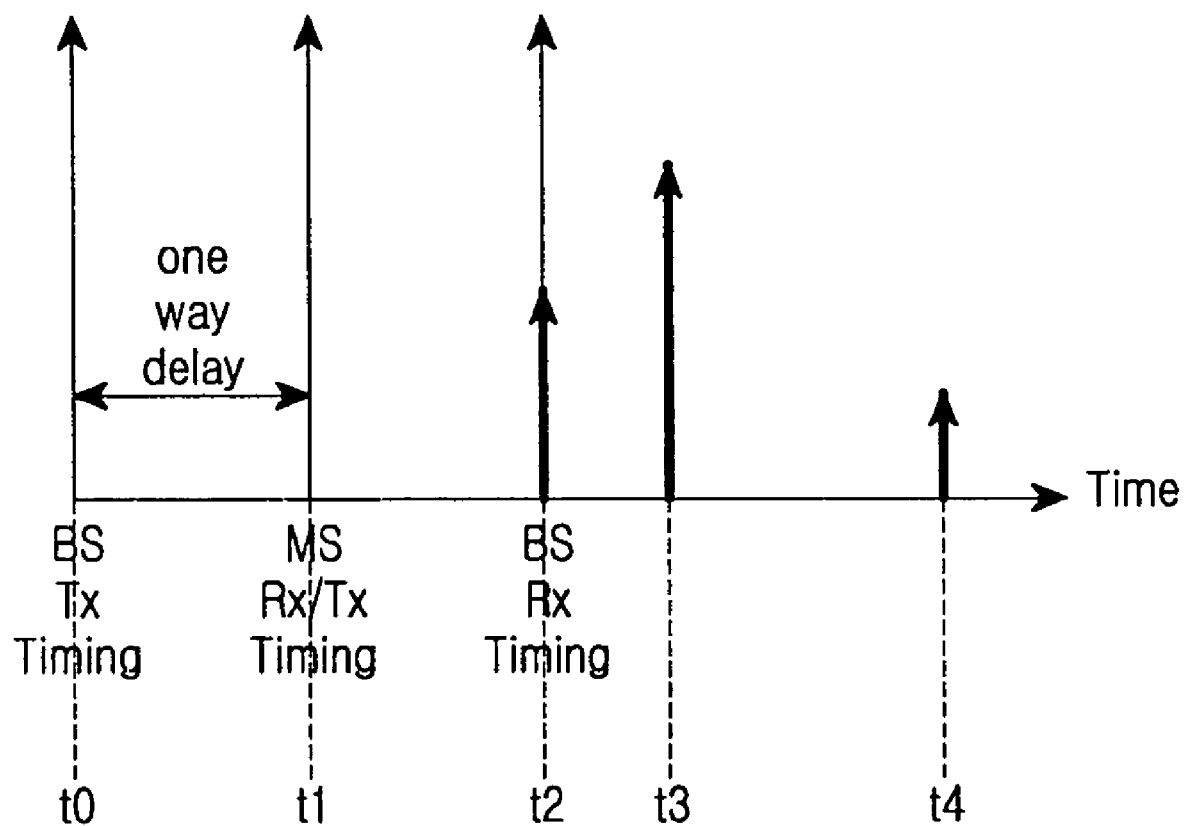
FIG. 7 is a graph illustrating a multipath profile in accordance with an embodiment of the present invention.

Referring to FIG. 7, the horizontal axis represents time and the vertical axis represents the intensity of a signal received through multiple paths. A signal transmitted from the BS at a time-point t0 is received by the MS at a time-point t1. A signal transmitted from the MS at a time-point t1 is received by the BS at time-points t2, t3, and t4 through multiple paths. In relation to the first path, half of a delay time between the BS arrival time-point t2 and the time point t0 is a delay time corresponding to the distance between the BS and the MS.

A FFT processor 620 transforms the multipath profile according to FFT, and finds a channel transfer function as shown in Equation (2).

$$a_n = \sum_{m=0}^{M} h_m \exp\left\{-j\frac{2\pi nm}{N}\right\} \quad \text{Equation (2)}$$

In Equation (2), $a_n$ denotes a channel gain of the n-th subchannel. $h_m$ denotes the path intensity in the m-th path delay of a unit of an OFDM sampling period. M denotes the maximum value of the path delay of the unit of an OFDM sampling period. N denotes the number of subchannels.

Figure 8:
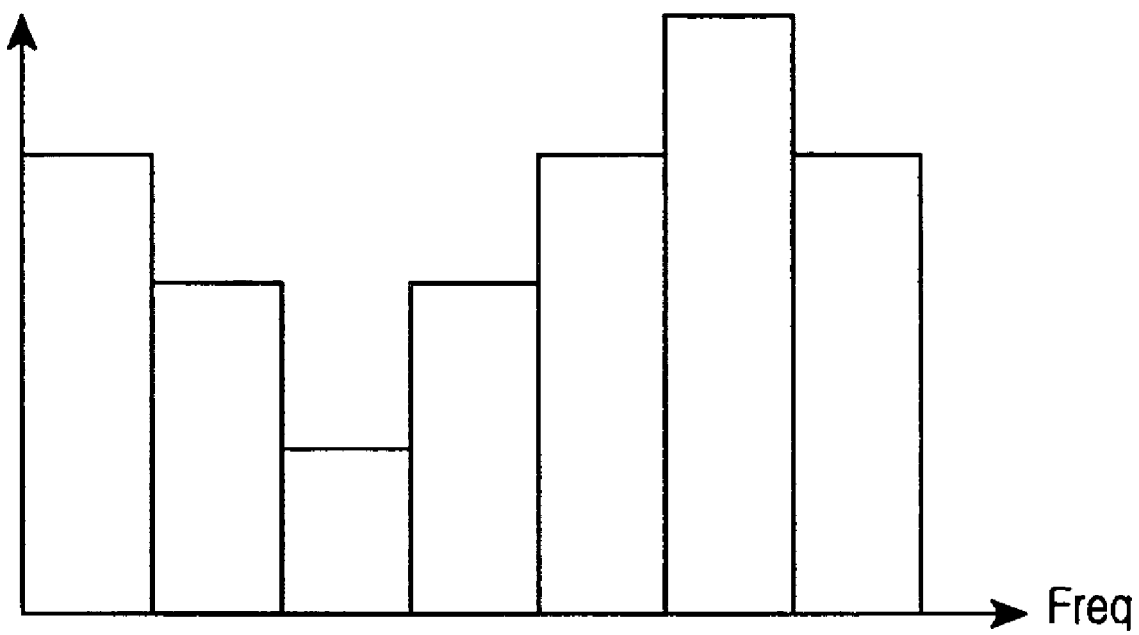
FIG. 8 is a graph illustrating a channel transfer function after performing a fast Fourier transform (FFT) operation on the multipath profile in accordance with an embodiment of the present invention.

FIG. 8 is a graph illustrating the channel transfer function expressed by Equation (2).

Figure 9:
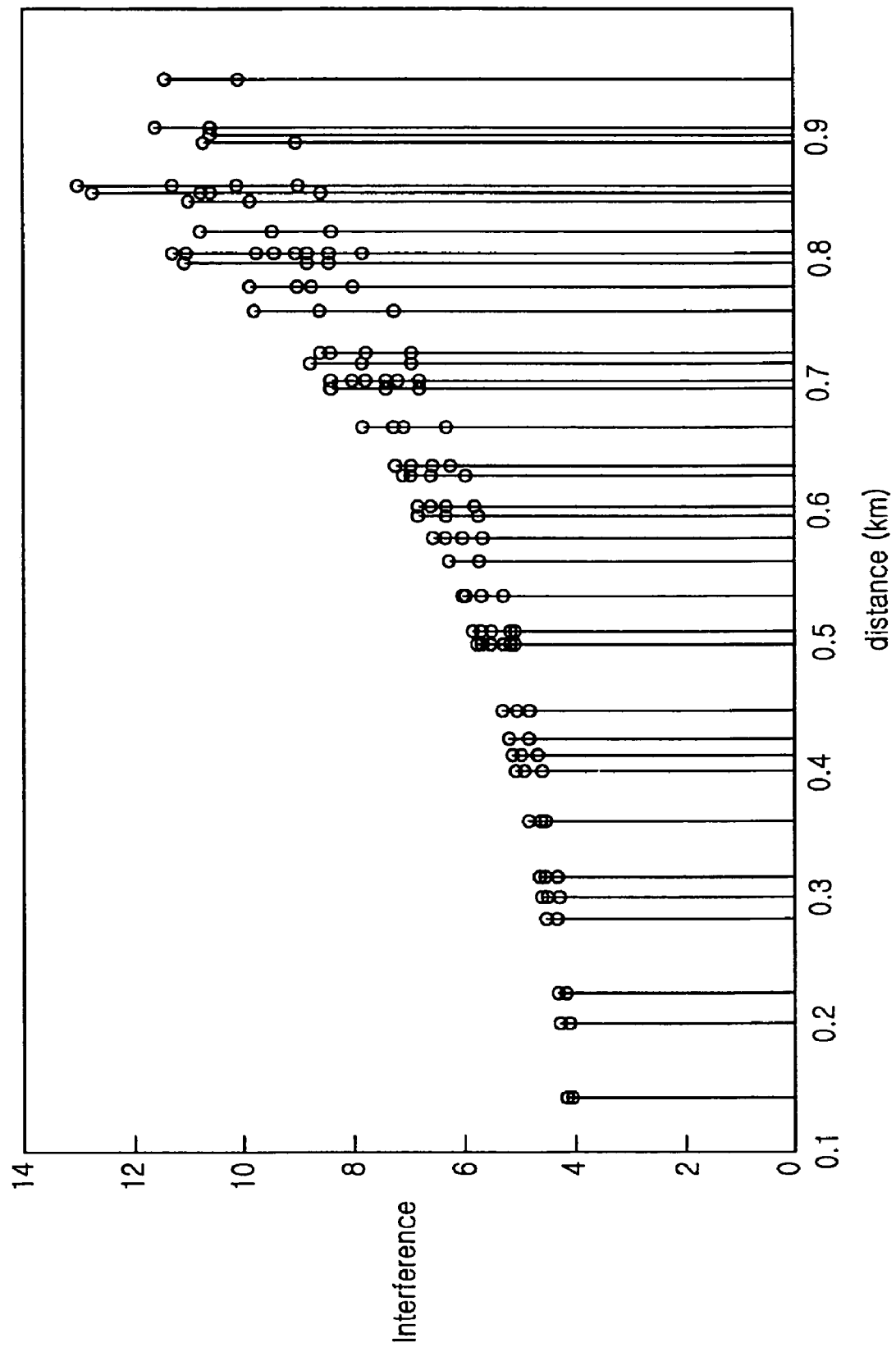
FIG. 9 is a graph illustrating interference power according to the distance between a base station and a user terminal in accordance with an embodiment of the present invention.

An interference estimator 630 estimates the distance $d_k$ between User k and the BS using the delay of the first path from the multipath profile illustrated in FIG. 7. Then, downlink interference power values are computed from all possible user locations corresponding to predetermined distances using FIG. 9. FIG. 9 is a graph illustrating interference according to the distance between the user and the BS. The horizontal axis represents distance, and the vertical axis represents interference power.

The interference estimator 630 computes average interference power using Equation (3).

$$I_k = \frac{1}{2\pi} \int_0^{2\pi} \sum_{i=1}^{N_n} \frac{P_T(i)}{N} \left( \frac{\sqrt{(d_k \cos\theta - x_i)^2 + (d_k \sin\theta - y_i)^2}}{d_0} \right)^{-\beta} d\theta \quad \text{Equation (3)}$$

In Equation (3), $I_k$ denotes an interference power estimate for an arbitrary subchannel of User k. It is assumed that an interference signal is additive white Gaussian noise and interference power is the same between all subchannels. $N_n$ denotes the number of adjacent cells. $P_T(i)$ denotes the total transmission power of the i-th BS. ($d_k \cos\theta$, $d_k \sin\theta$) denotes a location of User k. ($x_i$, $y_i$) set by a service provider is a location (or coordinates) of the i-th BS of an adjacent cell. $d_0$ denotes the reference distance of path loss. $\beta$ denotes a path loss exponent.

A SIR calculator 640 assumes an input uplink channel gain is the same as or substantially the same as a downlink channel gain based on the assumption that the channel state is the same during one frame. The SIR calculator 640 computes downlink SIRs of all subchannels of User k. The downlink SIR is defined as shown in Equation (4).

$$SIR_n = \frac{a_n^2 p_n}{I_k + \sigma^2} \quad \text{for all } n \quad \text{Equation (4)}$$

In Equation (4), $p_n$ denotes a transmission power of Subchannel n of User k, and $\sigma^2$ denotes additive white Gaussian noise power.

Figure 10:
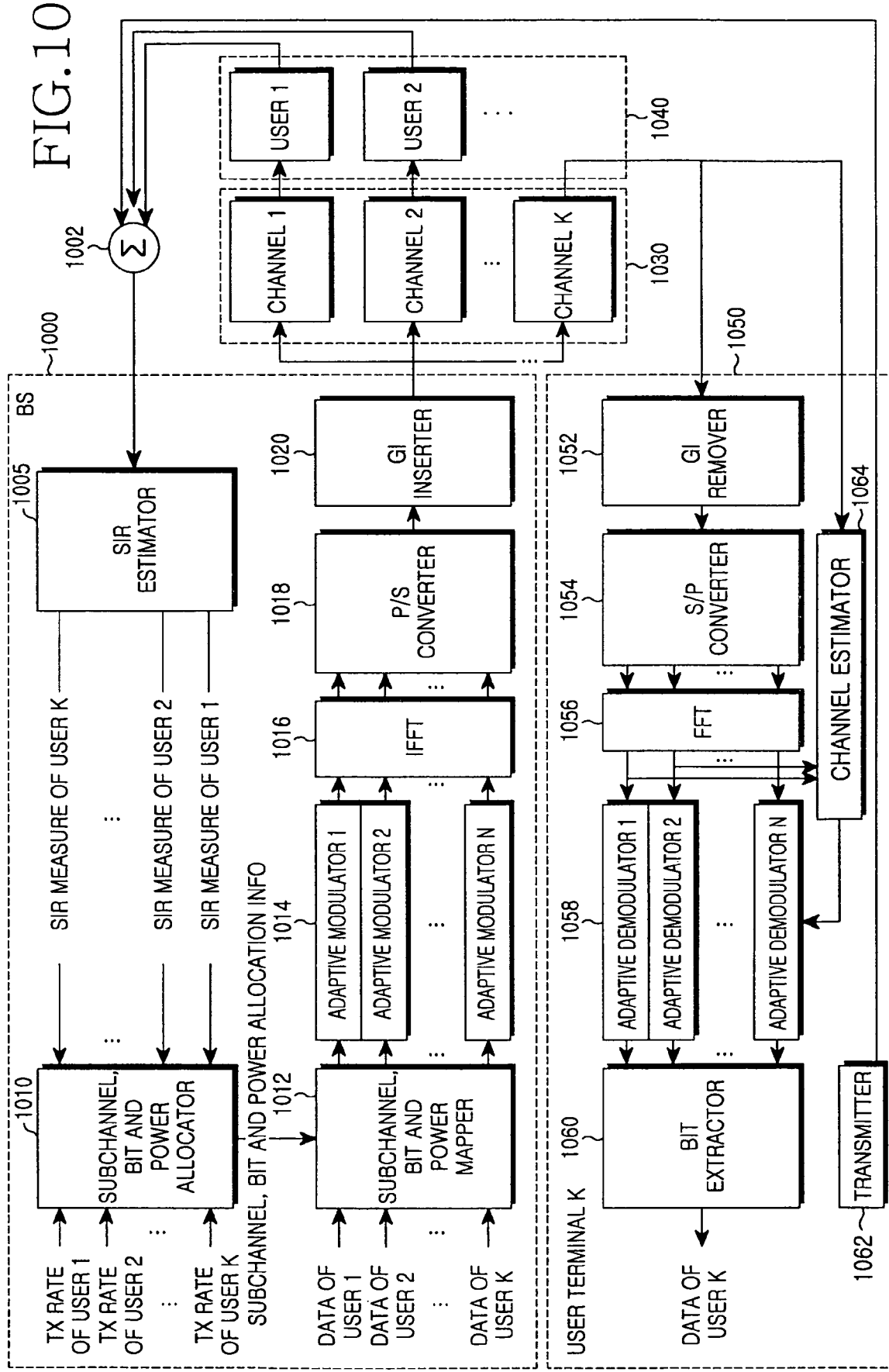
FIG. 10 is a block diagram illustrating an exemplary downlink cellular OFDMA apparatus for performing adaptive subchannel, bit and power allocation in which an SIR estimate is applied in accordance with an embodiment of the present invention.

FIG. 10 is a block diagram illustrating an exemplary downlink cellular OFDMA apparatus for performing adaptive subchannel, bit and power allocation in which a SIR estimation method is applied in accordance with an embodiment of the present invention. Because the apparatus of FIG. 10 is similar to that of FIG. 2, only additional components in accordance with an embodiment of the present invention will be described.

Referring to FIG. 10, an adder 1002 sums pilot signals transmitted from K user terminals 1040, and the BS 1000 receives the summed pilot signals.

Figure 1:
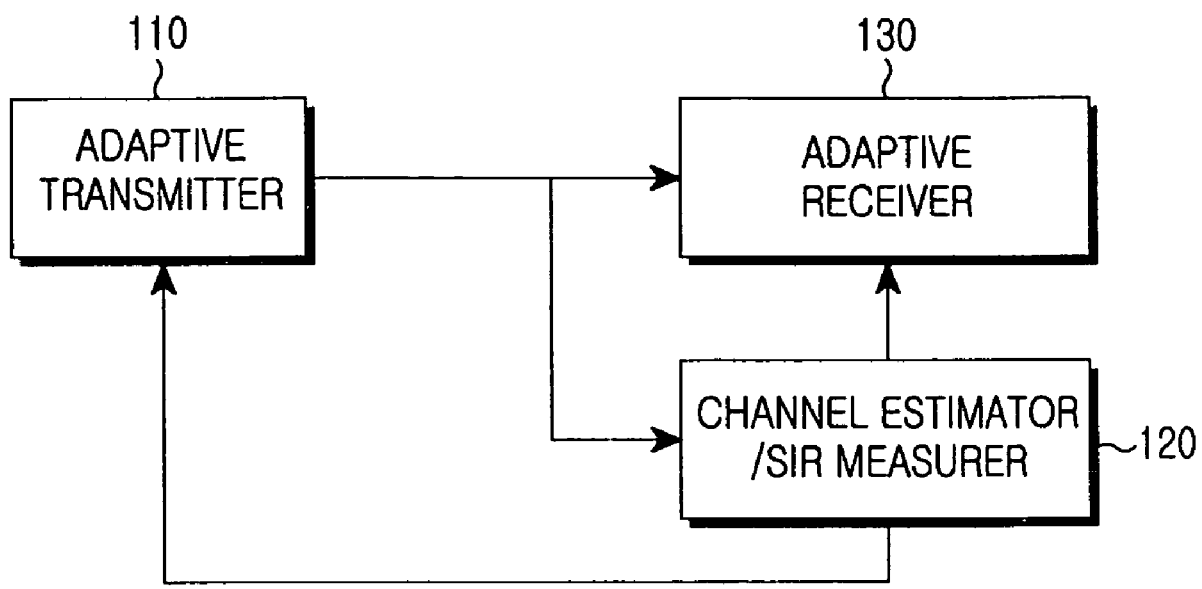
FIG. 1 is a block diagram illustrating a conventional adaptive transmission and reception apparatus based on a signal power to interference power ratio (SIR)
Figure 2:
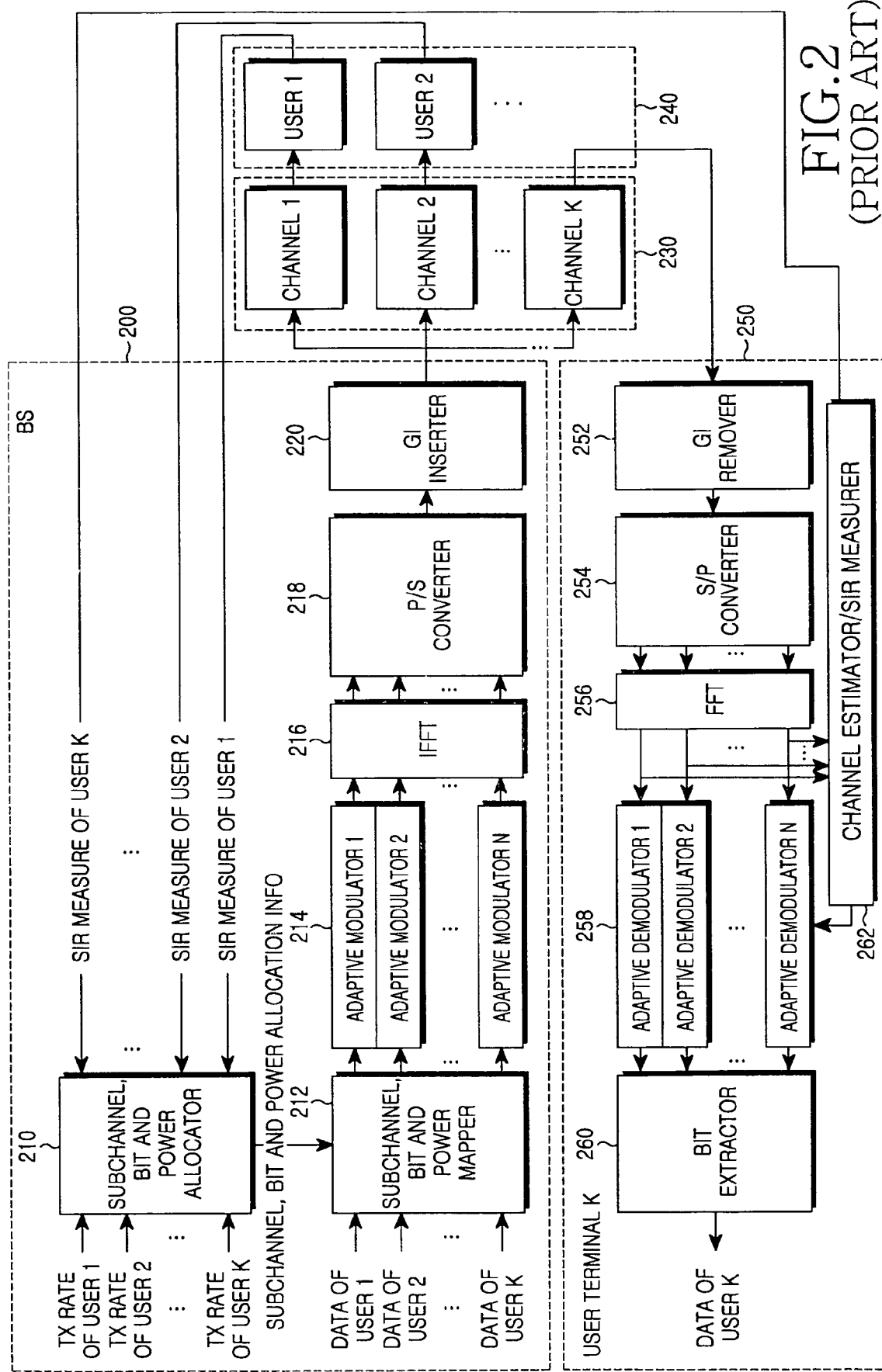
FIG. 2 is a block diagram illustrating a conventional downlink orthogonal frequency division multiple access (OFDMA) apparatus for performing adaptive subchannel, bit and power allocation.

As compared with the BS 200 of FIG. 2, the internal structure of the BS 1000 additionally comprises a SIR estimator 1005 in accordance with an embodiment of the present invention. The SIR estimator 1005 has the same structure as that of the SIR estimation unit 520 of the BS illustrated in FIG. 5. The SIR estimator 1005 estimates downlink SIR estimates for subchannels of all users through input pilot signals and outputs the SIR estimates to a subchannel, bit and power allocator 1010.

An internal structure of the K-th user terminal 1050 of the user terminals 1040 is illustrated in FIG. 10. In accordance with an embodiment of the present invention, a channel estimator 1064 receives signals output from an FFT processor 1056, computes channel estimates for all subchannels, and sends the channel estimates to adaptive demodulators 1058. In accordance with an embodiment of the present invention, User Terminal K 1050 comprises a transmitter 1062. The transmitter 1062 multiplexes data of User K and pilot data, spreads the multiplexed data with a PN code of User K, and outputs a result of the spread.

An exemplary method for estimating a SIR and adaptively performing transmission and reception through the downlink in the above-described apparatus will be described.

Figure 11:
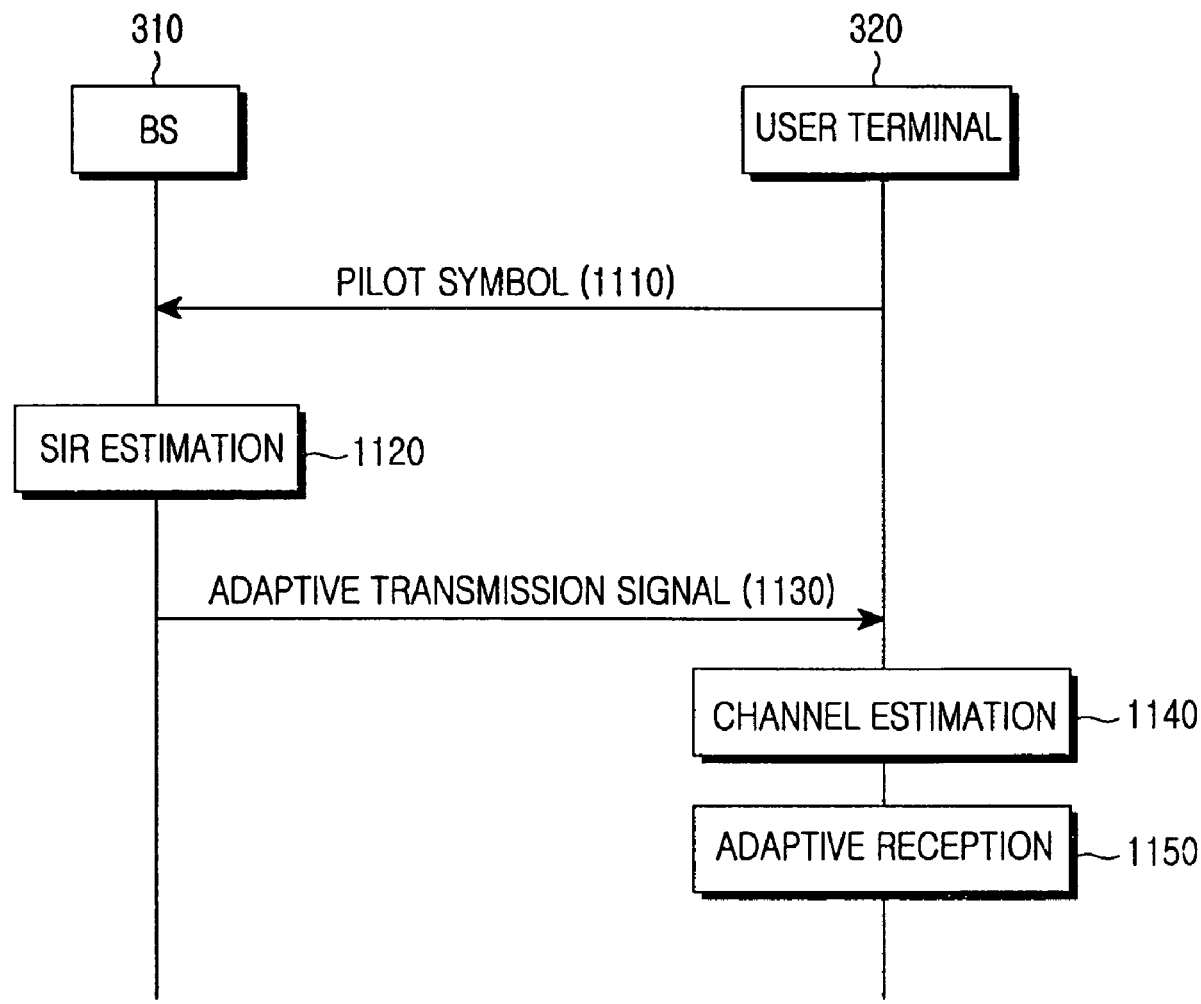
FIG. 11 is a signal flow diagram illustrating an exemplary downlink adaptive transmission and reception method based on SIR estimation in accordance with an embodiment of the present invention.

FIG. 11 is a signal flow diagram illustrating a downlink adaptive transmission and reception method based on a SIR estimated in a BS of a wireless communication system of a TDD scheme in which the same channel interference is present in accordance with an embodiment of the present invention.

Referring to FIG. 11, the transmitter 323 of the user terminal 320 transmits a pilot symbol spread with a unique PN code to the uplink in step 1110. Then, the SIR estimator 314 of the BS 310 estimates a SIR of the user terminal using the received uplink pilot symbol in step 1120. In step 1130, the adaptive transmitter 318 of the BS 310 adaptively transmits data to the user terminal through the downlink on the basis of the SIR estimated in step 1120. The channel estimator 329 of the user terminal computes a channel estimate from a signal received through the downlink in step 1140. Then, the adaptive receiver 326 adaptively receives a signal through the downlink on the basis of the channel estimate computed by the channel estimator 329 in step 1150.

The process for estimating a SIR in the SIR estimator 314 of the BS 310 in step 1120 will be described with reference to the flow chart of FIG. 12 in more detail.

Figure 12:
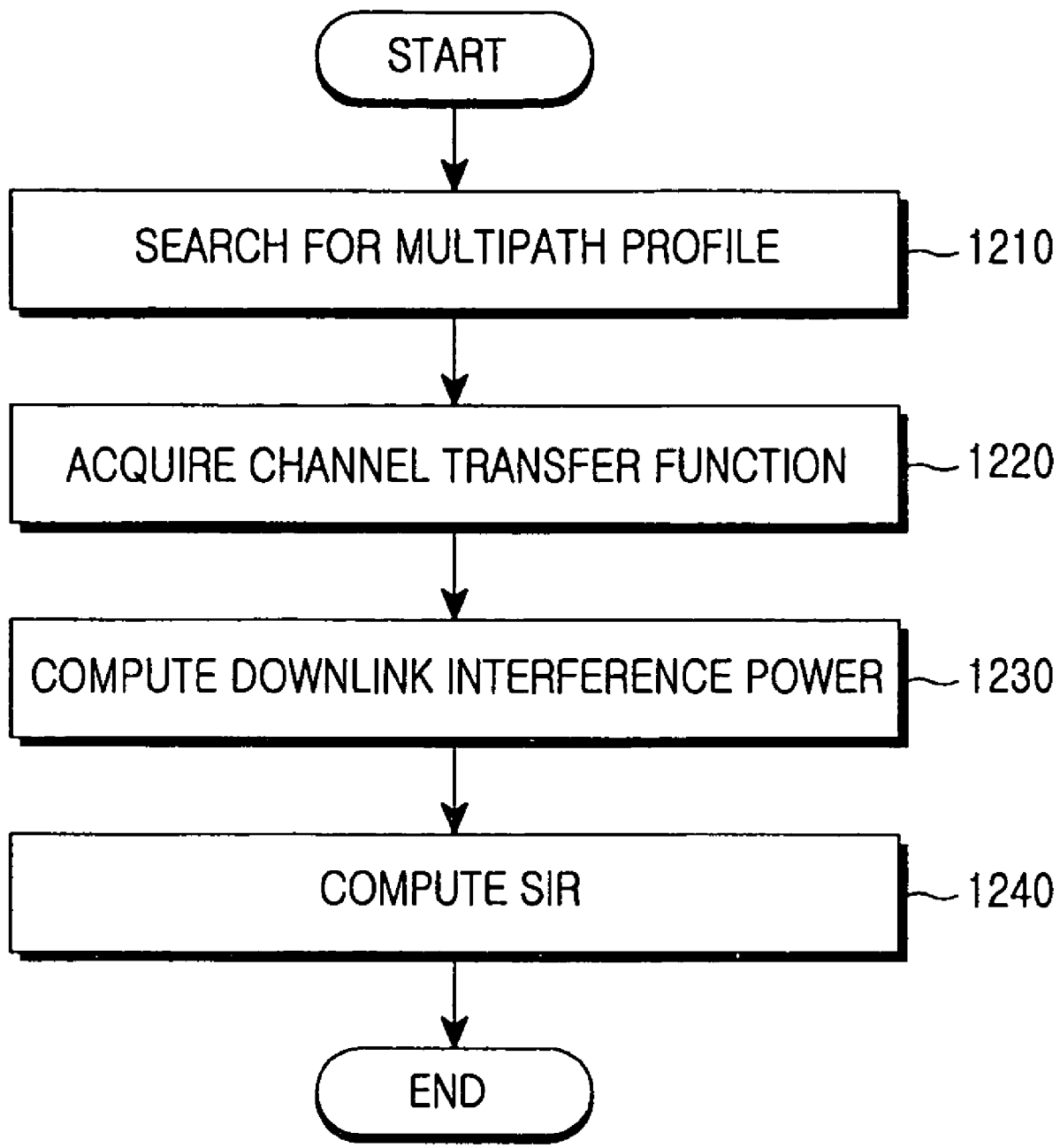
FIG. 12 is a flow chart illustrating an exemplary SIR estimation process of FIG. 6.

Referring to FIG. 12, the multipath profile measurer 610 of the SIR estimator 314 computes a correlation value and computes a multipath profile from the user terminal to the BS, after despreading a signal received by the BS with a PN code for the user terminal in relation to various path delay time points. The multipath profile comprises the path delay and intensity of each path, and is the same as illustrated in FIG. 7. A search for a multipath profile is performed in step 1210. The FFT processor 620 transforms the multipath profile according to FFT and finds a channel transfer function as illustrated in FIG. 8 in step 1220. In step 1230, the interference estimator 630 estimates interference. The interference estimator 630 estimates the distance between User k and the BS from the first path delay. As described in relation to FIG. 9, downlink interference power values are computed from all possible user locations. The maximum value or the mean value is computed from the downlink interference power values.

In step 1240, the SIR calculator 640 of the BS 310 assumes an input uplink channel gain to be the same or substantially the same as a downlink channel gain based on an assumption that the channel state is the same for both the uplink and downlink during one frame. The SIR calculator 640 computes downlink SIRs for all subchannels of the user terminal. The SIR is computed as a ratio of the channel transfer function found in step 1220 to the downlink interference power computed in step 1230.

As is apparent from the above description, the embodiments of the present invention never reduce uplink throughput because it does not require SIR feedback. Because of this merit, the adaptive transmission and reception scheme can extend its application range at a high rate rather than a low rate. Because the SIR feedback is not required, a problem of performance degradation due to feedback error does not occur.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for adaptively performing transmission according to a state of a channel transmitted from a transmitter to at least one receiver, comprising:
    a signal to interference ratio estimator for despreading signals, spread by the unique code of the receiver from the at least one receiver, using the unique code, measuring a multipath profile represented a delay time and signal strength of downlink signal transmitted through the multipath between the transmitter and the receiver from the despreading signals, transforming a multipath profile according to the FFT and acquiring a channel transfer function, estimating a distance between the transmitter and the receiver according to the delay time and estimating interference power between the transmitter and the receiver according to the distance, and estimating a signal to interference ratio of the subchannels of the receiver using a ratio of a the signal FFT processed and the estimated interference power; and
    an adaptive transmitter for transmitting data to the at least one receiver based on the estimated signal to interference ratio.

2. The apparatus of claim 1, wherein the signal spread from the at least one receiver is a pilot symbol.

3. The apparatus of claim 1, wherein the signal to interference ratio estimator despreads signals received from a plurality of receivers and signal to interference ratios of channels between the transmitter and the plurality of receivers.

4. An apparatus for adaptively performing transmission and reception according to a state of a channel transmitted from a transmitter to a receiver, comprising:
    an adaptive transmitter for measuring a multipath profile represented a delay time and signal strength of downlink signal transmitted through the multipath between the transmitter and the receiver using a pilot symbol spread with a unique code from the receiver, transforming a multipath profile according to the FFT and acquiring a channel transfer function, estimating a distance between the transmitter and the receiver according to the delay time and estimating interference power between the transmitter and the receiver according to the distance, and estimating a signal to interference ratio of the subchannels of the receiver using a ratio of a the signal FFT processed and the estimated interference power and adaptively performing data transmission according to the signal to interference ratio; and
    an adaptive receiver for transmitting a pilot symbol spread with a unique pseudo noise code to the adaptive transmitter, calculating a channel estimate of a signal transmitted from the adaptive transmitter, and adaptively receiving the transmitted signal using the calculated channel estimate.

5. The apparatus of claim 4, wherein the adaptive receiver comprises:
    a transmitter for transmitting the pilot symbol spread with the unique pseudo noise code;
    a channel estimator for estimating a channel state using the signal received from the adaptive transmitter; and
    a receiver for receiving the signal on a basis of the channel estimate.

6. The apparatus of claim 5, wherein the transmitter comprises:
    a multiplexer for multiplexing input user data and known pilot data and outputting a result of the multiplexing; and
    a spreader for spreading an output of the multiplexer with a unique pseudo noise code and outputting a result of the spreading.

7. The apparatus of claim 5, wherein the transmitter comprises:
    a spreader for spreading known pilot data with a unique pseudo noise code and outputting a result of the spreading; and
    a multiplexer for multiplexing input user data and the spread pilot data and outputting a result of the multiplexing.

8. A method for adaptively performing transmission according to state of a channel transmitted from a transmitter to a receiver, comprising the steps of:
    transmitting a pilot symbol spread with a unique pseudo noise code from the receiver to the transmitter;
    receiving the pilot symbol spread with the unique pseudo noise code;
    measuring a multipath profile represented a delay time and signal strength of downlink signal transmitted through the multipath between the transmitter and the receiver from the despreading pilot symbol;
    transforming a multipath profile according to fast Fourier transform (FFT) and acquiring a channel transfer function;
    estimating a distance between the transmitter and the receiver according to the delay time and estimating interference power between the transmitter and the receiver according to the distance;

calculating a signal power to interference power ratio using a ratio of a signal output from an FFT processor and a signal output from an interference estimator in the transmitter; and adaptively transmitting a signal from the transmitter to the receiver according to the estimated signal to interference ratio.

9. The method of claim 8, further comprising the steps of:

estimating a channel state of the signal received from the transmitter in the receiver; and adaptively receiving the signal in the receiver on a basis of a channel estimate.

* * * * *